(12) United States Patent
Bik et al.

(10) Patent No.: US 7,101,142 B2
(45) Date of Patent: *Sep. 5, 2006

(54) HITCH MOUNTED REFUSE CONTAINER LIFTING SYSTEM

(76) Inventors: Russell J. Bik, 1939 Corbett Highlands Pl., Arroyo Grande, CA (US) 93420; William J. Kelley, 1952 Corbett Highlands Pl., Arroyo Grande, CA (US) 93420

( * ) Notice: Subject to any disclaimer, the term of this patent is extended or adjusted under 35 U.S.C. 154(b) by 171 days.

This patent is subject to a terminal disclaimer.

(21) Appl. No.: 10/778,951

(22) Filed: Feb. 12, 2004

(65) Prior Publication Data

US 2004/0219003 A1    Nov. 4, 2004

Related U.S. Application Data

(63) Continuation-in-part of application No. 10/302,168, filed on Nov. 21, 2002, now Pat. No. 6,698,995.

(51) Int. Cl.
*B60P 9/00* (2006.01)

(52) U.S. Cl. .................. 414/462; 280/490.1; 224/519; 224/521

(58) Field of Classification Search ................ 414/462; 280/490.1, 491.1, 491.2, 491.5; 224/519, 224/521, 547, 549, 545
See application file for complete search history.

(56) References Cited

U.S. PATENT DOCUMENTS

| | | | | |
|---|---|---|---|---|
| 3,376,986 A | * | 4/1968 | Farber | 414/446 |
| 3,409,103 A | * | 11/1968 | Ritson | 180/127 |
| 4,381,069 A | * | 4/1983 | Kreck | 224/502 |
| 4,400,129 A | * | 8/1983 | Eisenberg et al. | 414/462 |
| 4,932,829 A | * | 6/1990 | Miller | 414/462 |
| 5,029,740 A | * | 7/1991 | Cox | 224/484 |
| 5,106,002 A | * | 4/1992 | Smith et al. | 224/506 |
| 5,211,526 A | * | 5/1993 | Robinette | 414/550 |
| 5,221,173 A | * | 6/1993 | Barnes | 414/346 |
| 5,366,338 A | * | 11/1994 | Mortensen | 414/563 |
| 5,449,101 A | * | 9/1995 | Van Dusen | 224/506 |
| 5,738,261 A | * | 4/1998 | Dula | 224/533 |
| 5,826,485 A | * | 10/1998 | Bayne et al. | 91/405 |
| 5,931,362 A | * | 8/1999 | Chimenti | 224/521 |
| 5,961,272 A | * | 10/1999 | Short | 414/462 |
| 6,033,178 A | * | 3/2000 | Cummins | 414/462 |
| 6,039,227 A | * | 3/2000 | Stark | 224/521 |
| 6,164,896 A | * | 12/2000 | Cummins | 414/462 |
| 6,361,264 B1 | * | 3/2002 | Guthrie et al. | 414/462 |
| 6,390,344 B1 | * | 5/2002 | Edgerly | 224/531 |
| 6,401,999 B1 | * | 6/2002 | Hehr | 224/502 |
| 6,698,995 B1 | * | 3/2004 | Bik et al. | 414/462 |
| 6,755,433 B1 | * | 6/2004 | Krauss | 280/456.1 |

* cited by examiner

*Primary Examiner*—Gene O. Crawford
*Assistant Examiner*—Rashmi Sharma
(74) *Attorney, Agent, or Firm*—Felix L. Fischer (57) ABSTRACT

A hitch mountable refuse container transport device has a vertical element supporting a telescoping mount, in an exemplary embodiment, that carries engagement keys on a horizontal bracket. Each key is adapted for engagement with an upper attachment element and a lower attachment element on the refuse container. Adjustment of the telescoping mount lifts the containers for transport.

11 Claims, 14 Drawing Sheets

HITCH MOUNTED REFUSE CONTAINER LIFTING SYSTEM

REFERENCE TO RELATED APPLICATIONS

This application is a continuation in part of application Ser. No. 10/302,168 filed on Nov. 21, 2002 now U.S. Pat. No. 6,698,995, entitled HITCH MOUNTED REFUSE CONTAINER TRANSPORT DEVICE having common inventors with the present application.

BACKGROUND OF THE INVENTION

1. Field of the Invention

This invention relates generally to the field of refuse hauling and, more particularly, to a device mountable on a standard trailer hitch for lifting and transporting standardized residential refuse containers.

2. Description of the Related Art

Automation of collection devices for refuse containers has become an essential part of waste management for most locations whether metropolitan, urban or rural. Waste and recycling companies have developed standardized refuse containers that employ an integrated attachment recess and restraining bar. The containers are typically constructed of high impact polyethylene or other plastic. The attachment recess is molded into one side of the container with a horizontal restraining bar mounted in the recess. A vertical tine on a robotic lifting arm mounted to the side of the refuse collection vehicle is inserted into the recess and engages the restraining bar for automatically hoisting the container in an arc to dump the container into the refuse bin on the truck chassis. The use of such containers by waste collection companies is increasing because it speeds the collection process and reduces the chances of back injury to their employees.

To minimize the number of cans for pick up at any residence and as a result of the automated lifting devices on the collection trucks, the containers are frequently of a size larger than can be lifted by an individual when full. In many cases, the containers are massive enough that one person cannot lift them comfortably even when empty. Most containers have integral wheels for maneuvering into position for pick-up and returning to their location for use, however, the wheels are not sufficiently durable or properly positioned for moving the containers any distance. The containers typically incorporate a hinged lid that swings open in the dumping cycle and is opened by hand for inserting refuse into the container. The hinge of the lid normally incorporates one or more handles for tilting the container onto its wheels.

The lack of easy transportability of the containers for the home or business owner is particularly problematic in rural areas where the containers may need to be moved some distance to a main road for collection by the refuse company. Some users tie or employ clamping devices to attach the handles of the container to a vehicle bumper or trailer hitch to roll the container behind a vehicle to and from the collection point. The general lack of serviceability of the wheels for this purpose typically results in premature failure of the wheels or other inconvenient failure or accident with the containers during such transport.

Several forms of refuse containers are presently in use on a consistent basis.

These containers

It is therefore desirable to provide a device that engages the existing container-lifting interface for transport of the containers.

SUMMARY OF THE INVENTION

A hitch mountable refuse container lifting system incorporates a hitch bar for mounting in a standard hitch receiver on a vehicle. The hitch bar has an upstanding stub at the opposite end from the end inserted into the receiver and a removable vertical element is carried by the stub. The vertical element is secured to the stub at a desired height by aligning one of a plurality of holes vertically spaced in the side of the element with an aperture in the stub and inserting a pin through the aperture and selected hole. The purpose of this adjustment is to compensate for the variability of hitch heights on various vehicles. Similarly, the amount of insertion of the hitch bar into the receiver hitch is adjustable by means of a similar row of aligning apertures secured at the desired amount of insertion using a pin. The purpose of this adjustment is to permit variable amounts of access to the lift when standing between it and the back of the vehicle.

A vertically translating mount is received by the vertical element. Vertical movement of the mount is achieved through the use of a lead screw that engages a threaded plane in the lower half of the vertical element or similar elevating element. As the lead screw is rotated, the upper half of the telescoping mount extends or retracts. The lead screw is rotated by hand using a crank or, alternatively using an electric motor. Finally, an engagement key is attached to the telescoping mount. The key has an upper engagement element configured to engage a standard upper attachment on a refuse container. A lower engagement element is vertically spaced below upper engagement element on the key to engage a lower attachment on the refuse container. When the container is lifted, the combination of attachments engaged by the key make it less likely that the container will bounce off the lifting system during transport.

BRIEF DESCRIPTION OF THE DRAWINGS

These and other features and advantages of the present invention will be better understood by reference to the following detailed description when considered in connection with the accompanying drawings wherein:

FIG. 4b is a front view of the embodiment of FIG. 4a.

FIG. 4c is a top view of the embodiment of FIG. 4a

FIG. 5 is a sectional view of the operating mechanism for the embodiments of FIGS. 2 and 4a;

DETAILED DESCRIPTION OF THE INVENTION

Figure 1:
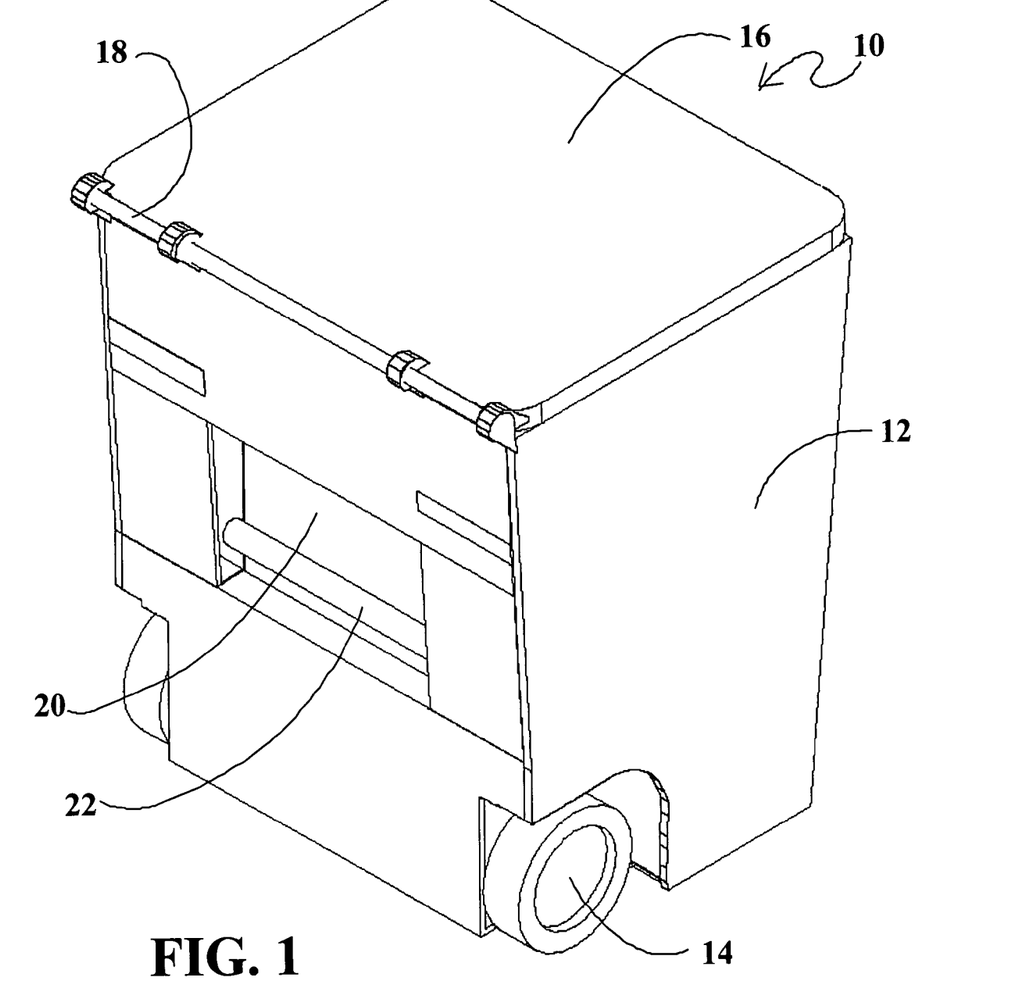
FIG. 1 is a pictorial view of one standard refuse container with which the present invention will be employed.

Turning to the drawings, FIG. 1 shows a refuse container 10 typical of the type to be used with the present invention. The container has a molded body 12 including cutouts to receive wheels 14. A lid 16 is hinged to the body using integral handle hinges 18. In this exemplary container type, a recess 20 in the body is employed for attachment to the automated dumping equipment present on the refuse collection vehicles using a lip along the upper periphery of the recess, as will be described in greater detail subsequently and a restraining bar or molded-in cross piece 22 carried horizontally within the recess. Alternative exemplary container types are described with respect to FIGS. 3b, 3c and 3d.

Figure 2:
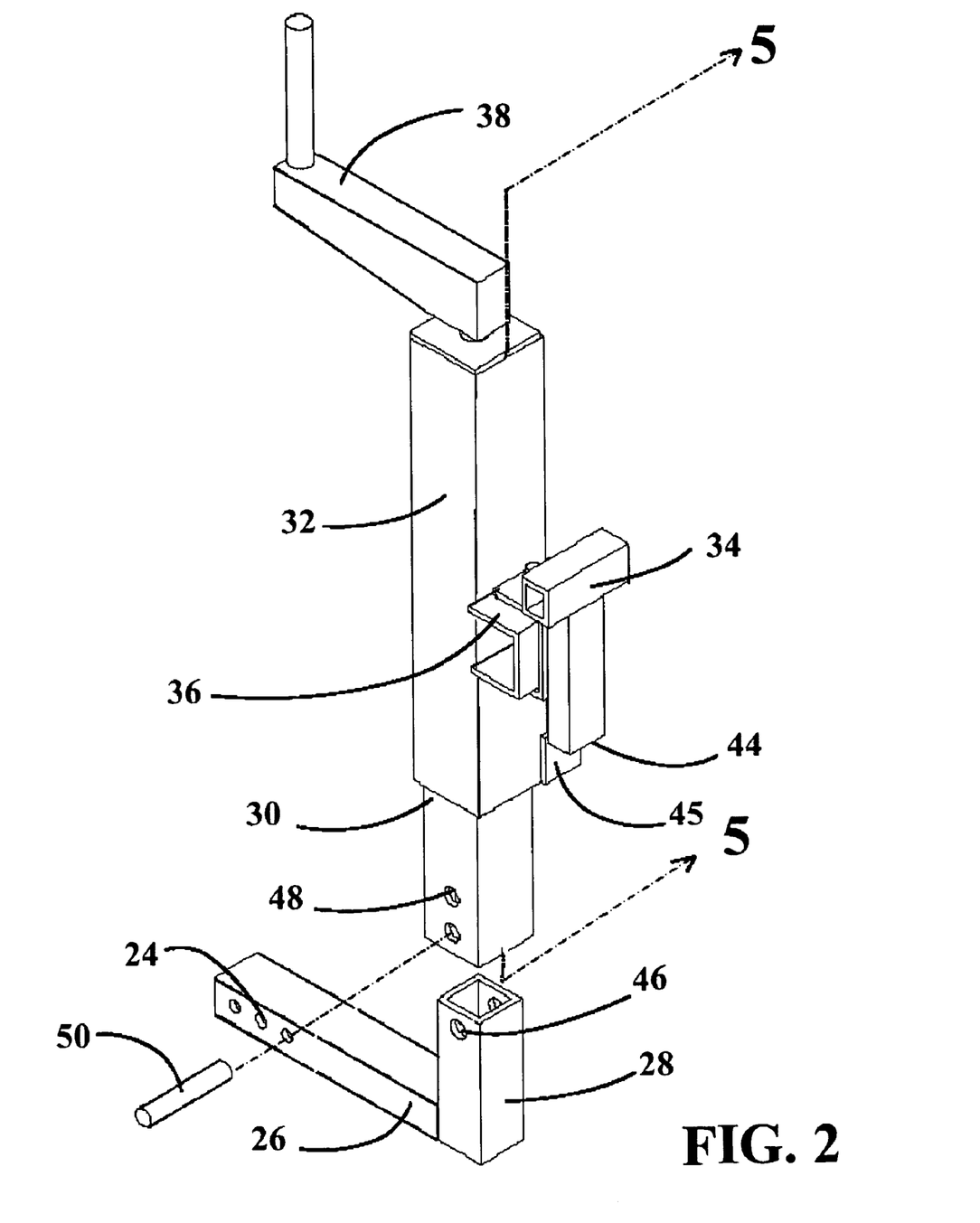
FIG. 2 is an isometric view of a first embodiment of the invention for attaching a single refuse container.

A first embodiment of the present invention is shown in FIG. 2. A hitch bar 24 is provided to be carried by the receiver (not shown) in a standard towing hitch assembly present on many cars, sport utility vehicles and pickup trucks. A row of locking apertures 26 align with mating holes in the receiver for insertion of a pin to lock the hitch bar into the receiver. A stub 28 extends from the hitch bar to carry a vertical element 30 on which a vertically translating element is received. For the embodiment shown in FIG. 2, the vertically translating element constitutes a telescoping mount 32. The key to engage the refuse container is a T-bar 34 cantilevered from the telescoping mount by a bracket 36 which spaces the T-bar from the wall of the mount. The telescoping mount is translated along the vertical element using a screw drive, described in greater detail subsequently, actuated by crank 38. The embodiment shown in the drawings employ square or rectangular cross section tube sized for mating elements to be telescopically received in or receive adjacent elements.

Figure 3A:
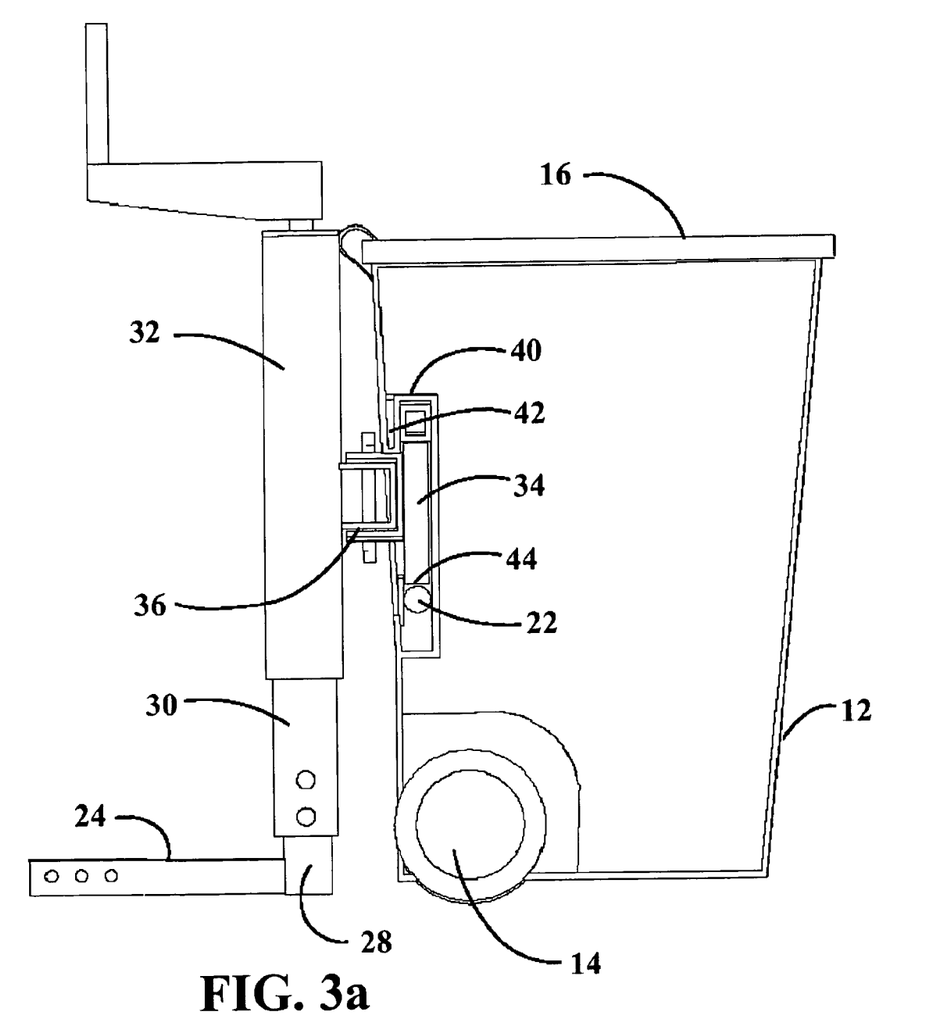
FIG. 3a is a side sectional view showing the key of the present invention engaging the attachments of a first exemplary container type.
Figure 3B:
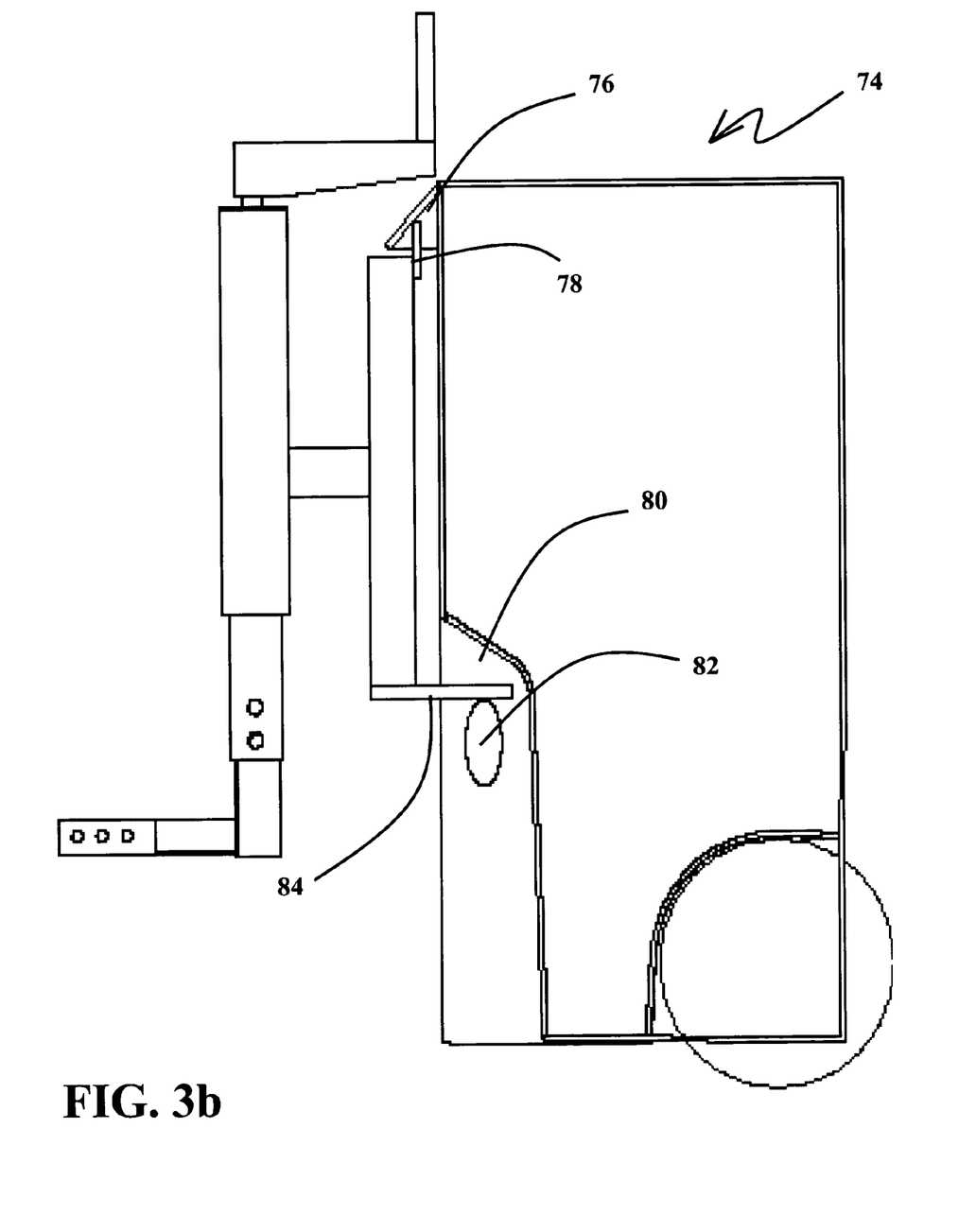
FIG. 3b is a side sectional view showing the key of the present invention engaging the attachments of a second exemplary container type.
Figure 3C:
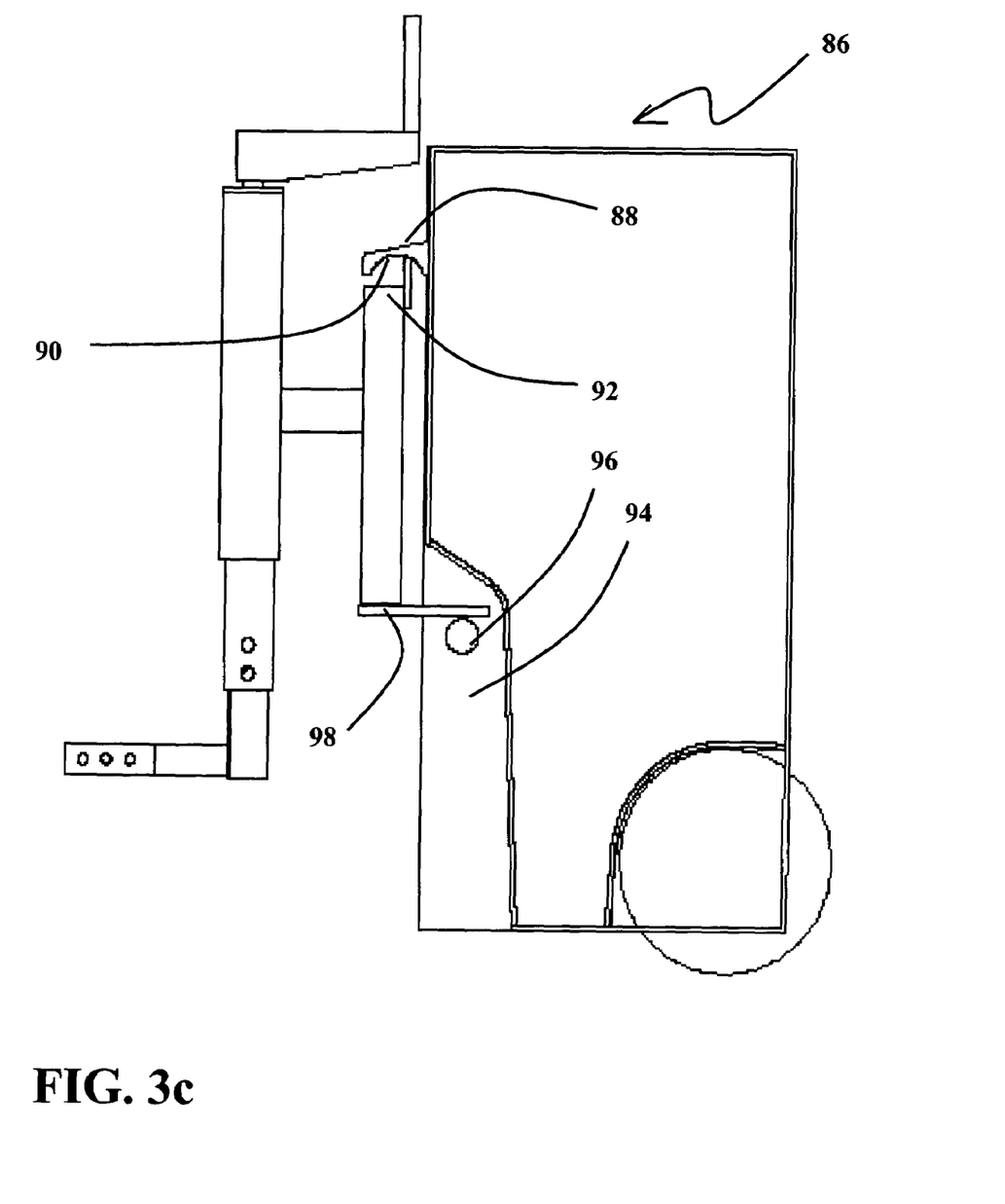
FIG. 3c is a side sectional view showing the key of the present invention engaging the attachments of a third exemplary container type.
Figure 4A:
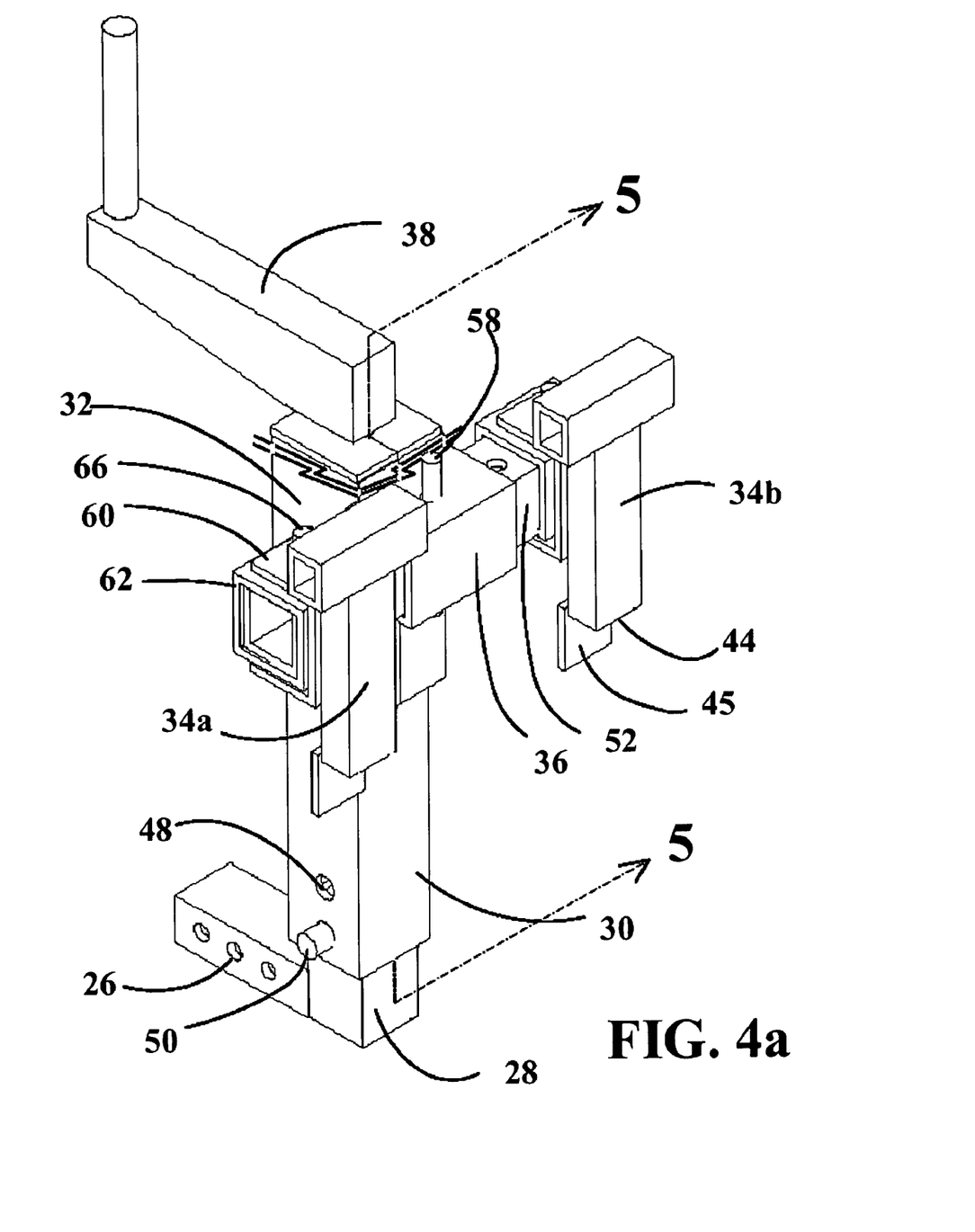
FIG. 4a is an isometric view of a second embodiment of the invention for attaching two refuse containers.

Operation of the invention is best described with respect to FIGS. 3a, 3b and 3c which shows a cutaway of the container to demonstrate the attachment mechanism for the present invention. For use with a first exemplary container type as shown in FIGS. 1 and 3a, the top of the T-bar is received within a recess in the container and extends into the channel 40 formed by the lip 42. The telescoping mount is translated upwardly using the screw drive and the T-bar extends fully into the channel. Because of the location of the recess at the back of the container, the balance of the container is such that it will rotate toward the bottom of the T-bar when lifted. The restraining bar 22 is engaged by a notch 44 in the bottom of the T-bar. In the embodiment shown in the drawings, the notch is formed by the bottom of the vertical arm of the T-bar and a plate 45 welded to the back of the vertical arm as best seen in FIGS. 2 and 4a. The restraining bar, urged into the notch by the weight of the container and the rotational moment about the horizontal arm of the T-bar, prevents the container from bouncing vertically and allowing the T-bar to be dislodged from the channel.

For the second exemplary container type 74 shown in FIG. 3b, a small recess 76 is present near the upper rim of the container into which an upper engagement element 78 of the key is received. The second container type incorporates a large recess 80 in the bottom portion of the container which holds a cross bar 82. The telescoping mount is translated upwardly using the screw drive and the upper engagement element, described in greater detail subsequently with respect to FIG. 6, engages the upper attachment element of the container. A lower engagement element 84 extends over the cross bar to prevent the container from bouncing vertically and uncoupling the upper element from the recess during transport.

In the third exemplary container type 86 shown in FIG. 3c, the upper attachment element of the container incorporates a horizontal protrusion 88 with an arcuate relief 90 in its lower surface. The upper engagement element 92 of the key mates with the relief to provide a vertical couple then the telescoping mount is translated upwardly. As with the second container type, the third container has a recess 94 in the lower portion of the container in which a cross bar 96 is mounted. The lower engagement element 98 of the key is received over the bar to restrain vertical movement with respect to the key.

Figure 3D:
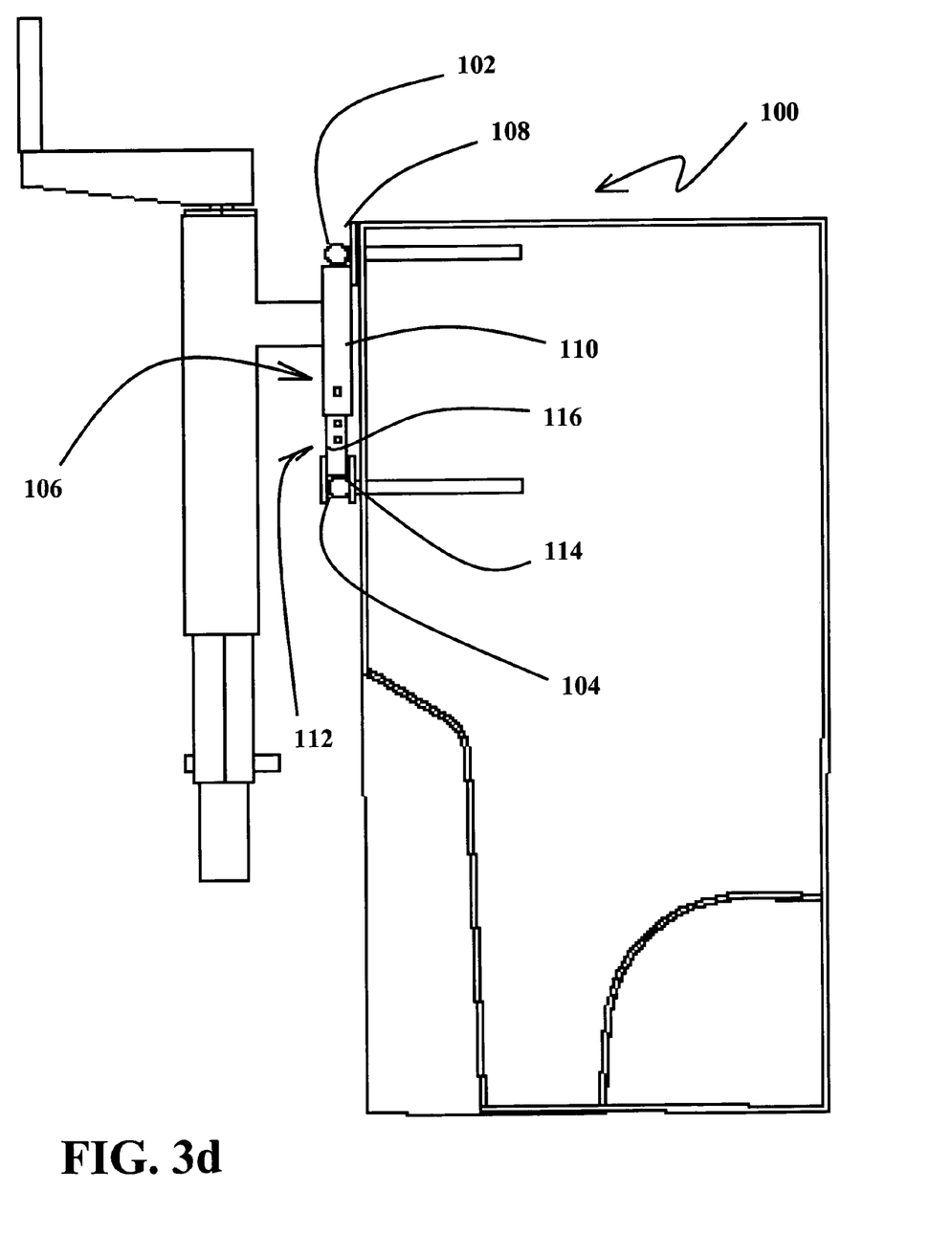
FIG. 3d is a side sectional view showing the key of the present invention engaging the attachments of a fourth exemplary container type.

Yet another refuse container configuration 100 is shown in FIG. 3d. The attachment elements for the container are a top bar 102 and a bottom bar 104. The key for engagement of this container incorporates an upper engagement element 106, which for the embodiment shown employs a vertical tab 108 extending from a connection body 110. The vertical tab is insertable behind the upper bar with the upper bar resting on the connection body for lifting. The lower engagement element 112 also employs a vertical tab 114 depending from a slider 116 received within the connection body as will be described in greater detail with respect to FIGS. 6e and 6f.

Figure 4B:
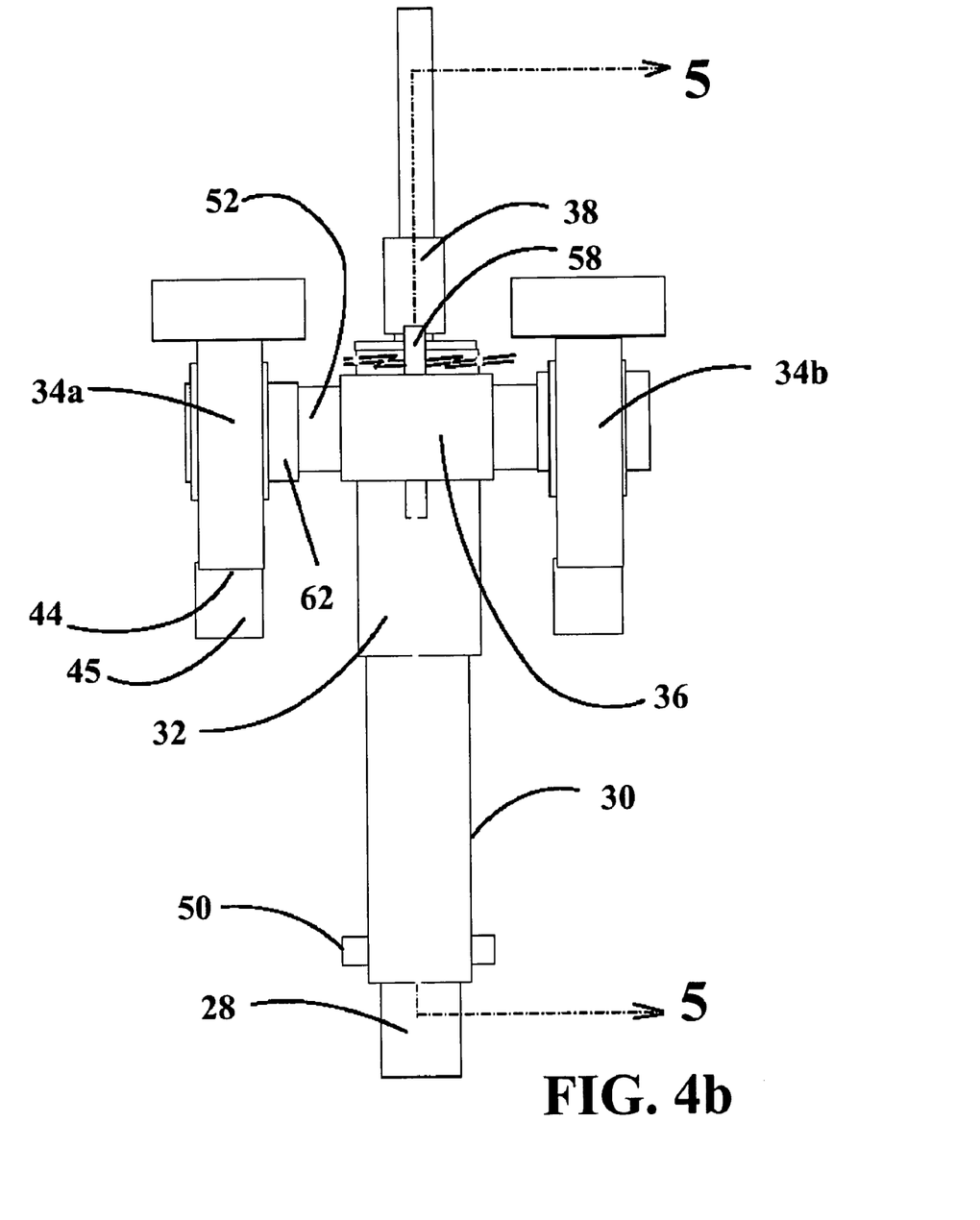
Figure 4C:
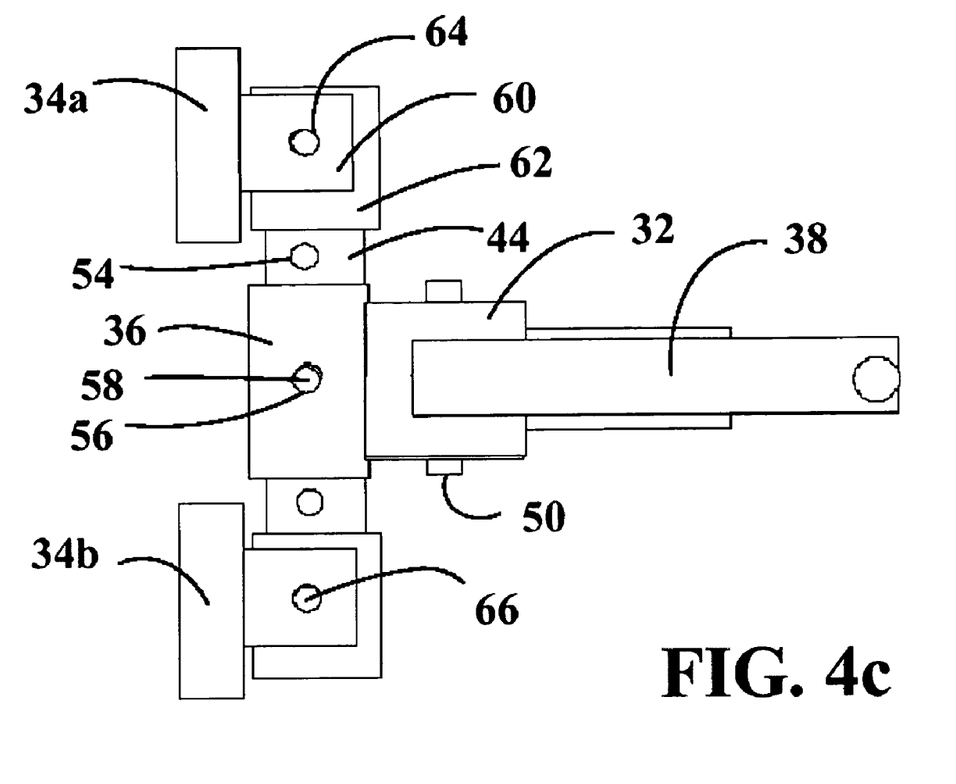

A second embodiment of the invention is shown in FIGS. 4a, 4b and 4c. As shown, the bracket 36 of the embodiment of FIG. 2 receives a horizontal bar 52 which carries two T-bar assemblies 34a and 34b spaced at each end. The embodiment shown employs the T-bars for use with the first container type, however, the other key types described subsequently are equally applicable for the multiple key embodiments. This arrangement allows two refuse containers to be lifted and transported simultaneously. Length of the bar for spacing of the T-bar assemblies is determined by the size of the containers to be carried. Positioning apertures 54 in the bar allow horizontal adjustment of the bar when cans of different size are employed or to equalize the torque on the bracket and telescoping mount when cans of significantly differing weight are carried. A locking aperture 56 in bracket 36 allows insertion of a pin or bolt 56 through one of the positioning apertures to fix the horizontal bar in place.

Each T-bar assembly has a channel 60 which is received over a spacer 62. Alignment apertures 64 provide for positioning of the T-bar on the horizontal bar and spacer with a pin or bolt 66 inserted to fix the T-bar in place. Operation of this embodiment is comparable to that described for the first embodiment with the channel of each refuse container being aligned over the horizontal arm of one T-bar. Upon translation of the telescoping mount upward by turning of the crank to engage the screw drive, the horizontal bar of each T-bar is fully engaged within the channel and the restraining bar on the container rotates into engagement with the notch at the base of the vertical arm of each T-bar. For the embodiments shown, the spacer provides a common dimension for the T-bar channel to allow attachment directly to the bracket 36 as shown in FIG. 2 or to the horizontal bar for the two container arrangements shown in FIG. 4a. A third T-bar can be carried on the bracket with the horizontal bar in place to allow carrying three containers, if desired.

Each of the described embodiments in FIGS. 2 and 4a–c incorporate a plurality of engagement holes 48 vertically spaced along the vertical element for selective alignment with aperture 46 in the stub for adjustment. Mounting the vertical element at the different engagement holes using a locking pin 50 allows the telescoping mount to be grossly positioned for varying hitch receiver heights and refuse container sizes to reduce the travel required for the telescoping mount translation mechanism. In an equivalent embodiment, the plurality of holes is alternatively placed in the stub with a single aperture in the vertical element. Positioning of a similar mounting pin (not shown) through the receiver hitch and into one of the row of holes 26 in the hitch bar permits access to the crank from a location between the refuse container and back of the vehicle when the container is too large for the user to reach the crack by reaching over the container.

Figure 5:
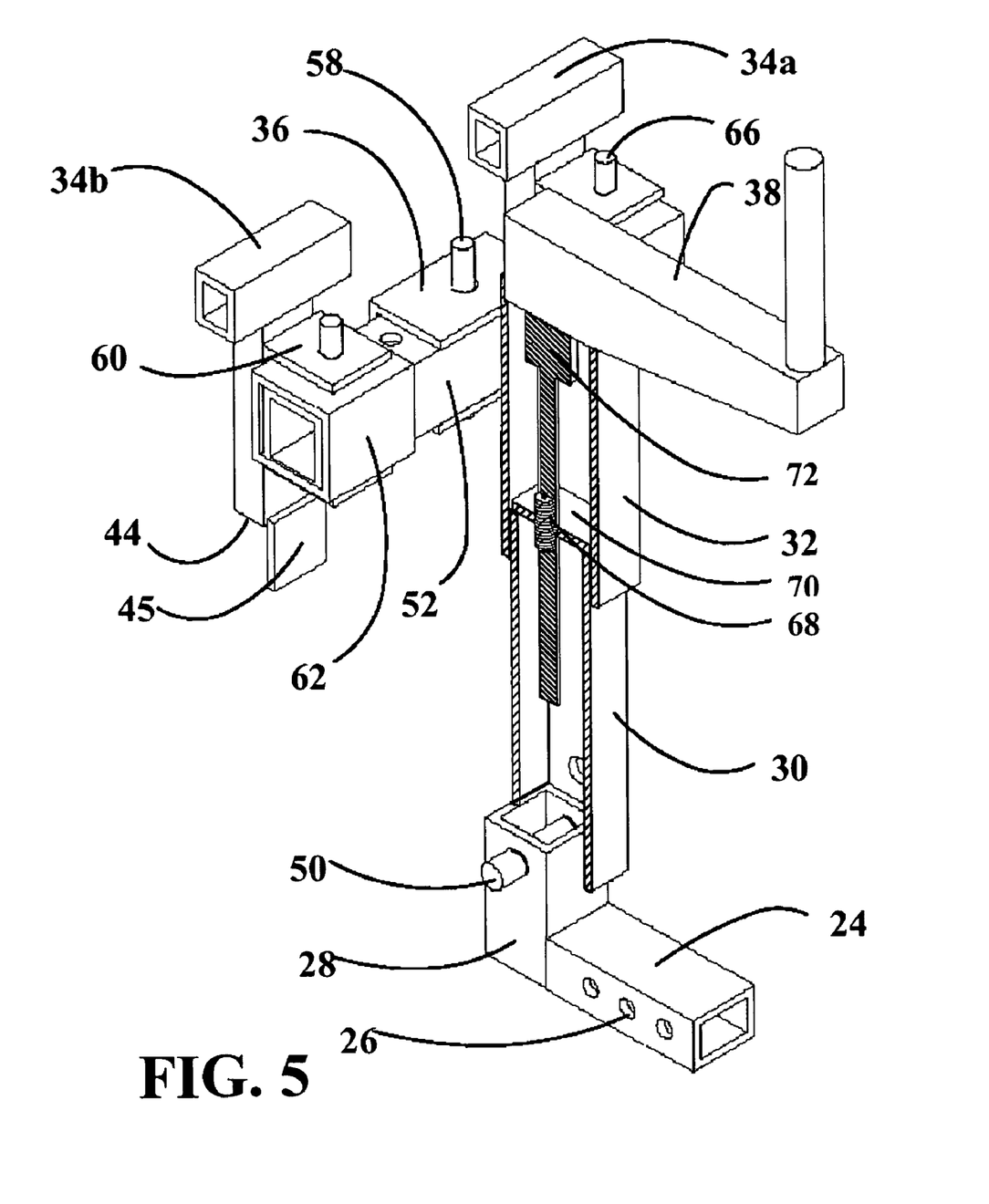

FIG. 5 shows a first embodiment of the telescoping mount translation mechanism for the invention as shown in FIGS. 2 and 4*a*. The telescoping mount incorporates a lead screw 68 rotated by crank 38 which is engaged by threaded receiver 70 rigidly held in the vertical element. A flanged cap 72 restrains the lead screw within the telescoping mount while allowing rotational motion. Those skilled in the art will recognize alternative bearing arrangements for the lead screw attachment to the telescoping mount.

The hand crank for operation of the screw drive employed in the embodiments disclosed herein is replaceable in alternative embodiments with an electric motor and gear train as described in co-pending application Ser. No. 10/302,168, the disclosure of which is incorporated herein by reference.

Figure 6A:
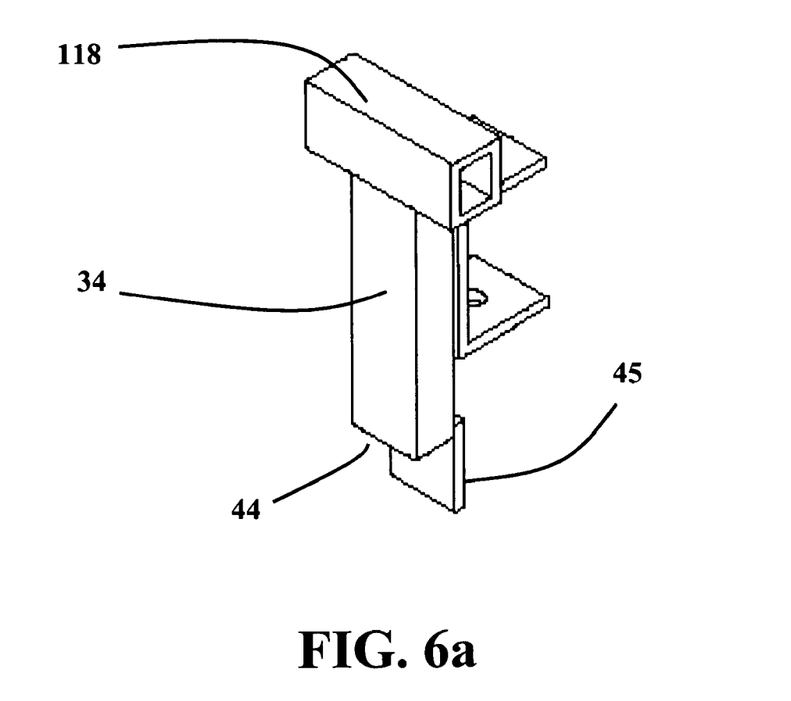
FIGS. 6a–g are isometric views of elements of exemplary keys as adapted for the container types shown in FIGS. 3a–d; and, FIG. 7 is an isometric view of an alternative vertical translation system for use with the invention.

The keys employed for lifting of the refuse containers as described with respect to FIGS. 3*a*–*d*, engage attachments integral to the containers. FIG. 6*a* shows a key employed with embodiments of the invention as disclosed in FIGS. 2 and 3*a*. The key 34 comprises a T-bar having an upper engagement element 118 which comprises the top of the T. The upper engagement element is received within the recess in the container for lifting the container. The notch 44 formed by the backing plate 45 provide the lower engagement element of this embodiment of the key which engages the bar in the recess of the container to prevent bouncing of the container to dislodge the key from the recess.

Figure 6B:
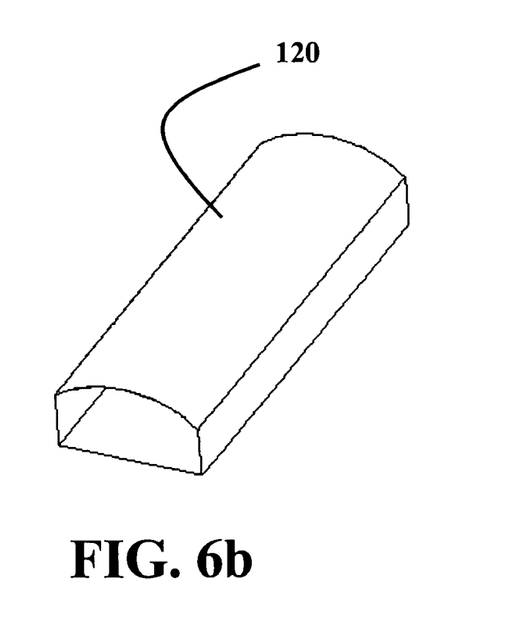
Figure 6C:
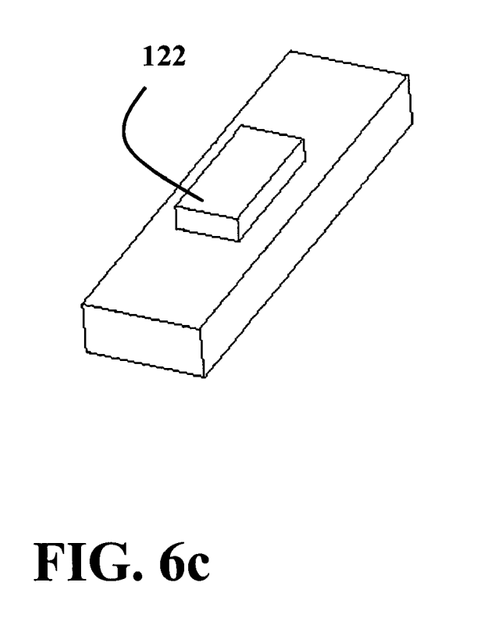

For various container configurations such as the container shown in FIG. 3*c*, the cross section of the upper engagement element is varied to specifically engage the upper attachment on the container. The upper attachment in the container of FIG. 3*c* has an arcuate relief in the horizontal protrusion. A key with an upper engagement element 120 having a length or a cross section with an arcuate surface of equal radius to the relief in the horizontal protrusion, as shown in FIG. 6*b* is employed for securing the key more closely in the relief. Similarly, if a boxed relief is employed in the container, an upper engagement element 122 with a stepped length or cross section as shown in FIG. 6*c* may be employed.

Figure 6D:
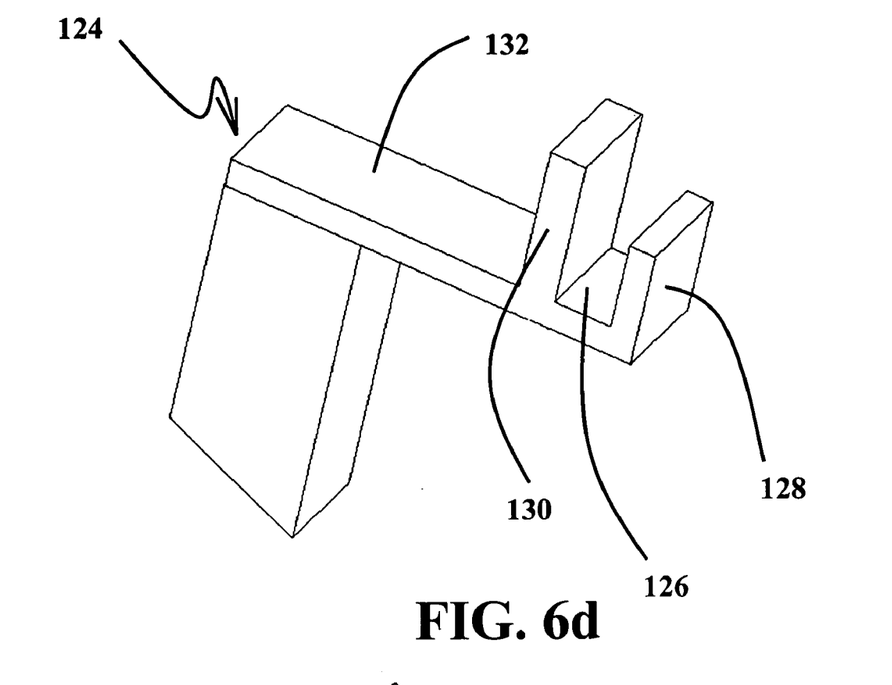

FIG. 6*d* shows yet another embodiment of the upper engagement element 124 for a key. The upper engagement element includes a channel 126 having an outer lip 128 and an inner lip 130. For the embodiment shown, the inner lip extends further from a body 132 than the outer lip. This embodiment of the key can be employed with several of the container types. The channel is ideally suited to engage the bar of the upper attachment in the container type disclosed in FIG. 3*d* with the outer lip serving as the vertical tab with the added security provided by the inner lip in engaging the bar. The upstanding lips of the channel are insertable into the recess of both the container types disclosed in FIGS. 3*a* and 3*b*. Depending on the dimensions of the channel and the horizontal protrusion, either the inner lip or the outer lip engages the arcuate relief in the protrusion for engaging the container type disclosed in FIG. 3*c*. In alternative embodiments of this key type, the outer lip extends further from the body than the inner lip.

Figure 6E:
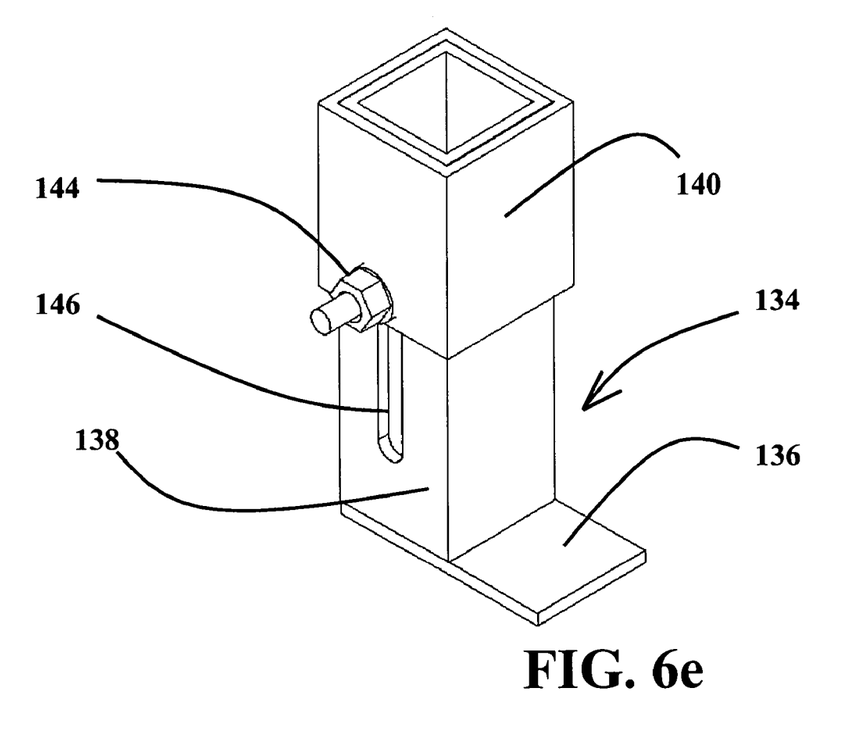
Figure 6F:
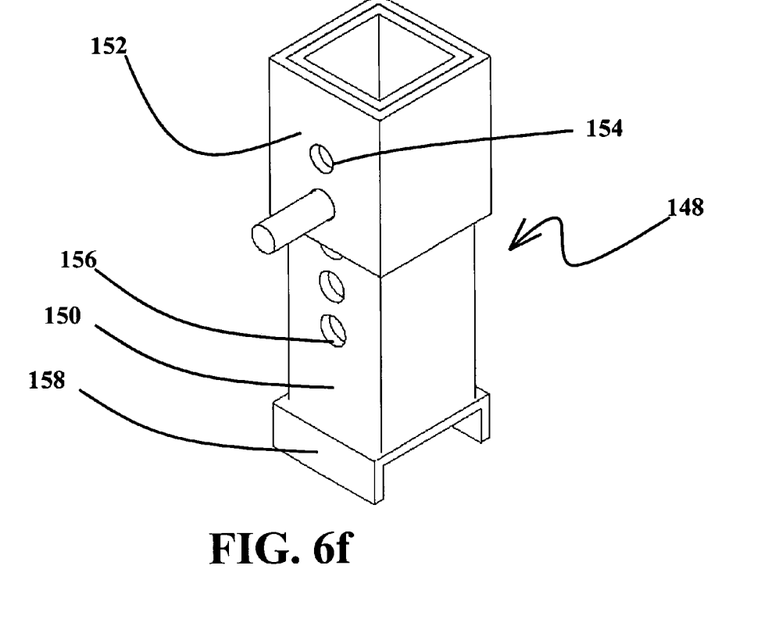

Several forms of lower engagement elements for the keys employed by embodiments of the invention are shown in FIGS. 6*e* and 6*f*. FIG. 6*e* discloses a lower engagement element 134 which incorporates a horizontal flange 136 which engages the lower attachment bar in the container types disclosed in FIGS. 3*b* and 3*c*. The flange is attached to a telescoping base 138 which is received in a body 140 of the key. The telescoping base allows adjustment of the location of the flange to closely engage the bar thereby precluding dislodging of the container during transport. Securing of the position of the base is accomplished using a bolt 142 extending through a hole 144 in the body and through a slot 146 in the base. Tensioning of the bolt urges the sides of the body against the base to frictionally secure the position of the base. Those skilled in the art will recognize various forms of frictional securing elements employable in the key.

FIG. 6*f* discloses a second embodiment of the lower engagement element 148 for keys employed by embodiments of the invention used with container types shown in FIG. 3*d*. This embodiment also uses a base 150 telescopically received within a body 152 for adjustment. For the embodiment shown, instead of the infinitely variable adjustment provided by the slot and hole arrangement of previously described embodiment, multiple holes 154 are vertically arranged in the body for selective alignment with one or more holes 156 in the base. Insertion of a pin or bolt in the aligned holes secures the position of the lower engagement. A channel 158 depends from the lower surface of the base to engage the lower attachment bar of the container. Telescopic adjustment of the base allows the channel to be closely secured over lower attachment bar to prevent dislodgement during transport.

Figure 6G:
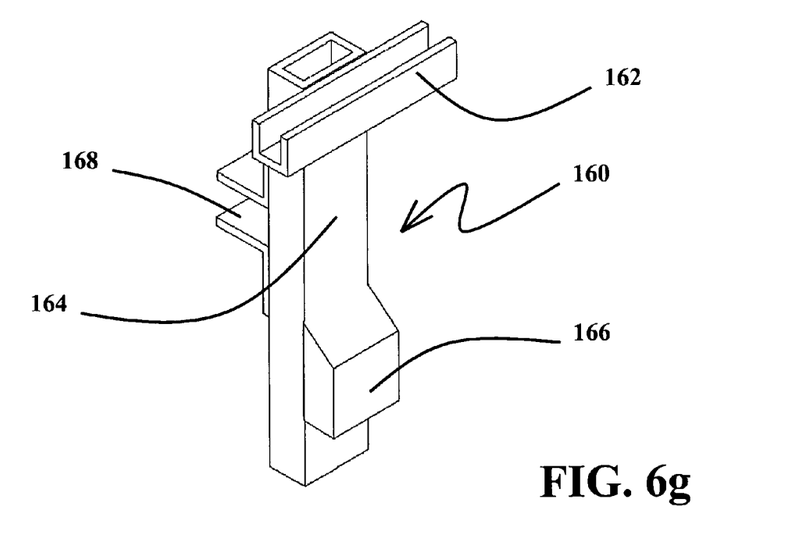

FIG. 6*g* discloses an engagement key 160 which incorporates a channel 162 as the top engagement element. This allows engagement of the upper bar attachment for containers as shown in FIG. 3*d* as well as engagement of the containers with upper recessed areas such as FIGS. 3*a* and 3*b*. A protrusion 164 attached to the vertical bar 166 forms the lower engagement element allowing the lower attachment bar to be received in the recess created by the protrusion and the vertical bar. Attachment brackets 168 allow the engagement key to be attached to the vertical translating element as previously described.

Figure 7:
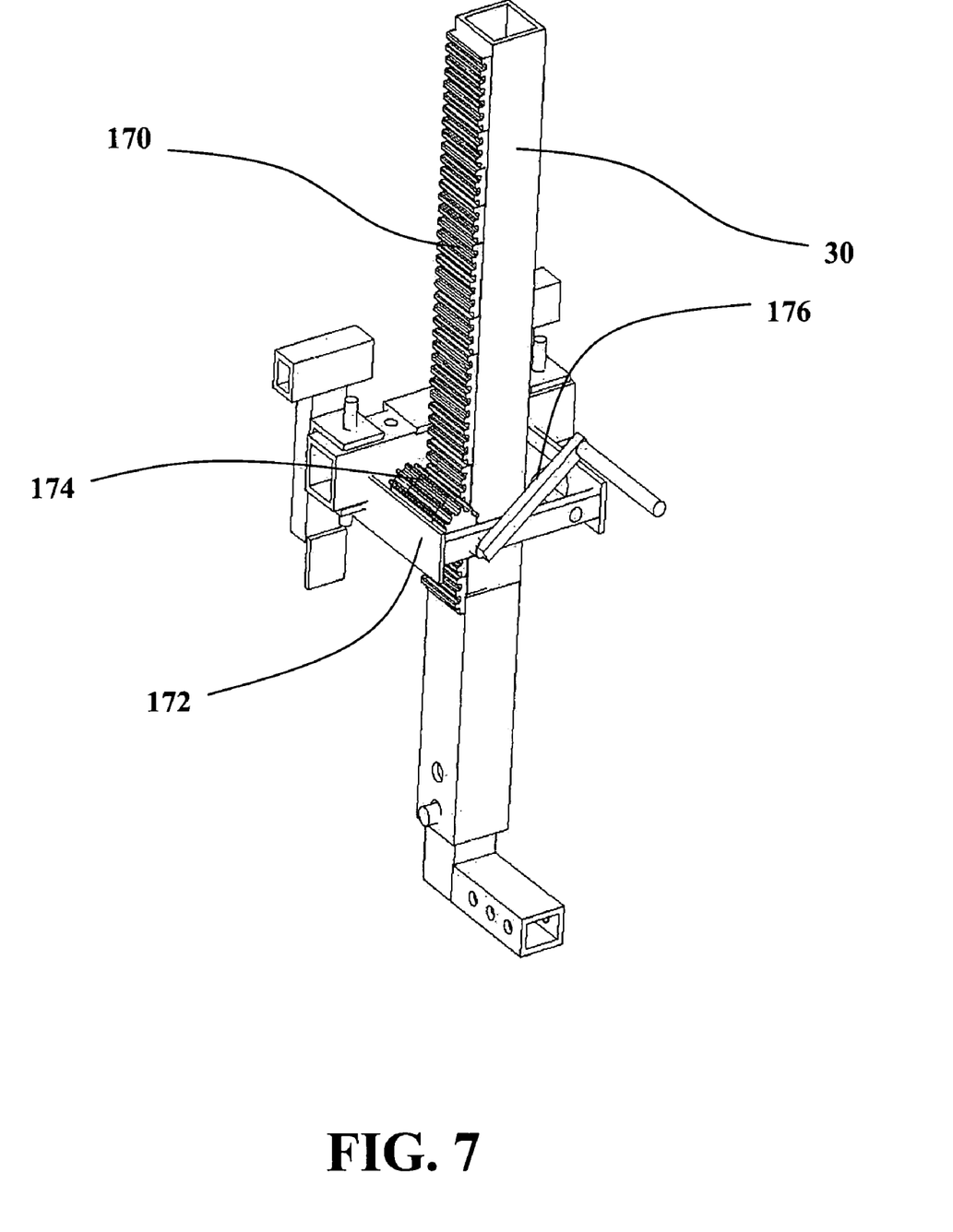

FIG. 7 demonstrates and alternative embodiment of the vertically translating element for raising the engagement keys where the compact envelope of the telescoping mount may not be necessary. As an alternative to the telescoping elements and lead screw, the vertical element 30 is extended and incorporates a gear rack 170. A carriage 172 engaged to the vertical element provides the attachment for the key or keys to engage the refuse container. For the embodiment shown in FIG. 7, the engagement keys and attachment to the carriage are substantially similar to that shown in detail in FIGS. 4*a*, 4*b* and 4*c* for the telescoping mount. Alternative embodiments for the engagement key and mounting as shown in FIGS. 3*b*, 3*c*, 3*d* and 6*b*–*f* are also applicable.

For the embodiment shown in FIG. 7, the carriage incorporates a pinion gear 174 operatively engaged on the rack of the vertical element and elevated by the side crank 176. In alternative embodiments, the side crank is positioned angularly displaced from the pinion gear through the use of a mating gear train to allow rotation of the crank in a plane having improved operating clearance. A ratchet and jack bar arrangement is also employed in alternative embodiments for raising the carriage on the vertical element.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A hitch mountable refuse container transport device comprising:
   a hitch bar for mounting in a standard hitch receiver on a vehicle, the hitch bar having an upstanding stub at an end distal from the receiver;
   a vertical element removably carried by the stub;
   means for securing the vertical element to the stub;
   a vertically translating element received by the vertical element;
   elevating means operably engaging the vertical element and vertically translating element for vertical translation thereof; and
   an engagement key attached to the vertically translating element and having an engagement element for engaging an attachment on the refuse container.

2. A hitch mountable refuse container transport device as defined in claim 1 wherein the engagement key further incorporates a second engagement element for engaging a second attachment on the refuse container.

3. A hitch mountable refuse container transport device as defined in claim 1 wherein the engagement key comprises a T-bar attached to the vertically translating element, the T-bar having a horizontal bar sized to be received within a recessed portion on the refuse container and engage a lip on an upper periphery of the recessed portion.

4. A hitch mountable refuse container transport device as defined in claim 2 wherein the engagement key comprises a T-bar attached to the vertically translating element, the T-bar having a horizontal bar sized to be received within a recessed portion on the refuse container and engage a lip on an upper periphery of the recessed portion, the T-bar further having a vertical bar with a notch at its base to receive a restraining bar horizontally mounted across the recessed portion.

5. A hitch mountable refuse container transport device as defined in claim 1 wherein the engagement key comprises an upper engagement element received within a relief on the container.

6. A hitch mountable refuse container transport device as defined in claim 5 wherein the engagement key further comprises a lower engagement element received against a lower attachment bar on the container to prevent vertical movement of the container to dislodge the upper engagement element.

7. A hitch mountable refuse container transport device as defined in claim 6 wherein the lower engagement element comprises a vertical flange depending from the body for engagement behind the lower attachment bar.

8. A hitch mountable refuse container transport device comprising:
   a hitch bar for mounting in a standard hitch receiver on a vehicle, the hitch bar having an upstanding stub at an end distal from the receiver;
   a vertical element removably carried by the stub;
   means for securing the vertical element to the stub;
   a telescoping mount received by the vertical element;
   a lead screw operably engaging the vertical element and telescoping mount for vertical translation of the telescoping mount;
   means for rotating the lead screw;
   at least one engagement key removably secured to the telescoping mount and having an upper engagement element for engaging an upper attachment on the refuse container; and
   means for securing the engagement key to the telescoping mount.

9. A hitch mountable refuse container transport device as defined in claim 8 wherein the means for securing the at least one engagement key to the telescoping mount comprises a rectangular bracket horizontally attached to the telescoping mount and a channel sized to be received over the rectangular bracket attached to the engagement key.

10. A hitch mountable refuse container transport device as defined in claim 9 wherein the rectangular bracket incorporates an aperture and further comprising a horizontal bar received within the rectangular bracket and having a plurality of apertures spaced for selective alignment with an aperture in the rectangular bracket to laterally position the horizontal bar,
    a pin receivable through the aperture in the bracket and the selected aperture in the bar to prevent lateral movement of the bar,
    a second engagement key, the engagement key and the second engagement key carried in spaced relation on the horizontal bar for transportation of two refuse containers simultaneously; and
    means for mounting the engagement key and the second engagement key to the horizontal bar.

11. A hitch mountable refuse container transport device as defined in claim 10 wherein the means for mounting comprises;
    a spacer received over the bar and having an aperture, the channel on the engagement key received over the spacer and having an aperture for alignment with the aperture in the spacer and a selected one of the apertures in the horizontal bar; and
    a pin inserted through the apertures in the channel and spacer and the selected one of the apertures in the horizontal bar.

* * * * *